United States Patent [19]
Forish et al.

[11] Patent Number: 6,139,334
[45] Date of Patent: Oct. 31, 2000

[54] INTEGRAL SOCKET BACKPLATE

[75] Inventors: John Andrew Forish, Huntertown; Mark Christopher Molinaro, Fort Wayne, both of Ind.

[73] Assignee: Cooper Automotive Products, Inc., Houston, Tex.

[21] Appl. No.: 09/154,092

[22] Filed: Sep. 16, 1998

[51] Int. Cl.[7] .............................. H01R 12/00; H05K 1/00
[52] U.S. Cl. ............................................. 439/56; 362/487
[58] Field of Search .................... 439/699.2, 56, 439/918, 57; 362/487, 226, 249, 252

[56] References Cited

U.S. PATENT DOCUMENTS

| | | | |
|---|---|---|---|
| 2,744,214 | 5/1956 | Marco et al. | 439/56 |
| 3,999,095 | 12/1976 | Pearce, Jr. et al. | 439/699.2 |
| 4,647,132 | 3/1987 | Mikola | 439/699.2 |
| 4,760,506 | 7/1988 | Mochizuki et al. | 362/226 |
| 4,940,422 | 7/1990 | Forish et al. | 439/356 |
| 4,958,429 | 9/1990 | Forish et al. | 29/877 |
| 5,000,702 | 3/1991 | Forish et al. | 439/699 |
| 5,035,643 | 7/1991 | Forish et al. | 439/358 |
| 5,076,777 | 12/1991 | Schmitt | 425/133.5 |
| 5,529,535 | 6/1996 | Forish | 439/56 |
| 5,536,174 | 7/1996 | Forish | 439/57 |
| 5,536,175 | 7/1996 | Forish | 439/57 |
| 5,630,729 | 5/1997 | Francis | 439/699.2 |
| 5,800,183 | 9/1998 | Paul et al. | 439/699.2 |
| 5,833,345 | 11/1998 | Ito | 362/66 |
| 5,857,763 | 1/1999 | Chen | 362/140 |

FOREIGN PATENT DOCUMENTS 06275117  9/1994  Japan.

*Primary Examiner*—Neil Abrams
*Assistant Examiner*—Hae Moon Hyeon
*Attorney, Agent, or Firm*—Reising, Ethington, Barnes, Kisselle, Learman & McCulloch, P.C.

[57] ABSTRACT

A backplate assembly that is mounted to a reflector and lens includes a base panel. The base panel includes a conductor for conducting electricity and at least one separately molded lamp socket assembly. The base panel includes a mount for integrally attaching the lamp socket assembly to the base panel. A front panel is attached to the base panel and has an aperture through which the lamp socket assembly passes.

27 Claims, 5 Drawing Sheets

INTEGRAL SOCKET BACKPLATE

TECHNICAL FIELD

The invention relates to a backplate assembly with an integral lamp socket assembly.

BACKGROUND

Backplate assemblies can accommodate multiple lamps and are used, for example, in tail lights of automobiles or other vehicles. A backplate assembly allows efficient preassembly of an automobile lamp assembly. The lamp assembly can then be installed as a single unit into a vehicle under construction and electrically connected to the wiring harness of the vehicle using a single connector socket.

One type of backplate assembly includes two substantially rigid panels. The panels include apertures which are aligned with each other. Conductors are disposed between the panels and include contact pads which extend into the apertures. The panels are interconnected so that the conductors are sealed between the panels and only the contact pads are exposed to the exterior of the backplate assembly. Multiple lamp socket assemblies may be inserted into the apertures of the backplate assembly. The backplate assembly, including the lamp socket assemblies, may be attached to a lighting assembly, such as a tail light lens, of a motor vehicle.

The dimensions of backplate assemblies may vary between car models to accommodate the dimensions of the lighting assembly of the car in which the backplate assembly is installed. For example, in some cars, one lamp socket assembly in the backplate assembly will be on a different plane relative to another lamp socket assembly in the same backplate assembly.

SUMMARY

In one general aspect, a backplate assembly for mounting to a reflector and lens includes a base panel, at least one separately molded lamp socket assembly, and a front panel attached to the back panel. The base panel has a conductor for conducting electricity and a mount configured to integrally attach the lamp socket assembly to the base panel. The front panel has an aperture through which the lamp socket assembly passes.

Embodiments may include one or more of the following features. For example, the backplate assembly may be further comprised of an individual socket seal adjacent to each aperture of the front panel. The socket seal may be made of a low durometer, thermoplastic elastomer. The socket seal may form an interference fit with the lamp socket assembly. It also may form a seal with a lighting assembly.

The base panel of the backplate assembly may include a post adjacent to the aperture, the lamp socket assembly may include a mounting hole, and the post may be cold staked in the mounting hole. The base panel may include four posts adjacent to the aperture, the lamp socket assembly may include four mounting holes, and the posts may be cold staked in the mounting holes.

The front panel may include three apertures and at least one of the three apertures may be on a different plane than the other apertures.

The lamp socket assembly may be made as a separate, thermoplastic, injection molded piece. It may include contact pads that are electrically connected to a conductor by a positive fit. The lamp socket assembly may have a bulb locating chamfer to locate and steady a stem of a light bulb. It also may have a second bulb locating chamfer to locate and steady a light bulb.

In another general aspect, a backplate assembly may be produced by fabricating a base panel having a conductor and posts, fabricating a front panel having an aperture and a socket seal adjacent to the aperture, injection molding as a separate piece a lamp socket assembly having mounting holes, and inserting contact pads into the lamp socket assembly.

Embodiments may include one or more of the following features. For example, the posts may be inserted into the mounting holes, a positive fit may be formed between the contact pads and the conductor, and the posts may be cold staked in the mounting holes. The aperture of the front panel may be passed over the lamp socket assembly, an interference fit may be formed between the lamp socket assembly and the socket seal, and the front panel may be sealed to the base panel. The backplate assembly may be attached to a lighting assembly.

The use of a lamp socket assembly that is integrally attached to a backplate assembly by cold staking offers the considerable advantage of providing a robust design that retains the lamp in the socket assembly at a desired location to maintain electrical continuity. It also has the advantage of providing a reliable electrical connection between the backplate assembly and lamp socket assembly. Moreover, a lamp socket assembly integrally attached to the backplate assembly reduces costs of manufacturing relative to a removable lamp socket assembly because a removable lamp socket assembly typically contains additional parts and requires additional assembly steps.

The use of one lamp socket assembly design provides considerable advantages. For example, it reduces the cost of manufacturing because one lamp socket assembly may be used for numerous backplate assembly designs having integral lamp socket assemblies, which increases the ability to automate the assembly of the lamp socket assembly in the backplate assembly. Using one lamp socket assembly also reduces the cost of manufacturing because fewer parts must be manufactured and stored in inventory.

The use of an individual socket seal around each socket provides the considerable advantages of reducing the seal cost per backplate assembly, requiring less compression force to seal the backplate assembly to the lighting assembly, and providing tolerances for lighting assembly dimensional variations.

Other features and advantages will be apparent from the following description, including the drawings, and from the claims.

DESCRIPTION

Figure 1:
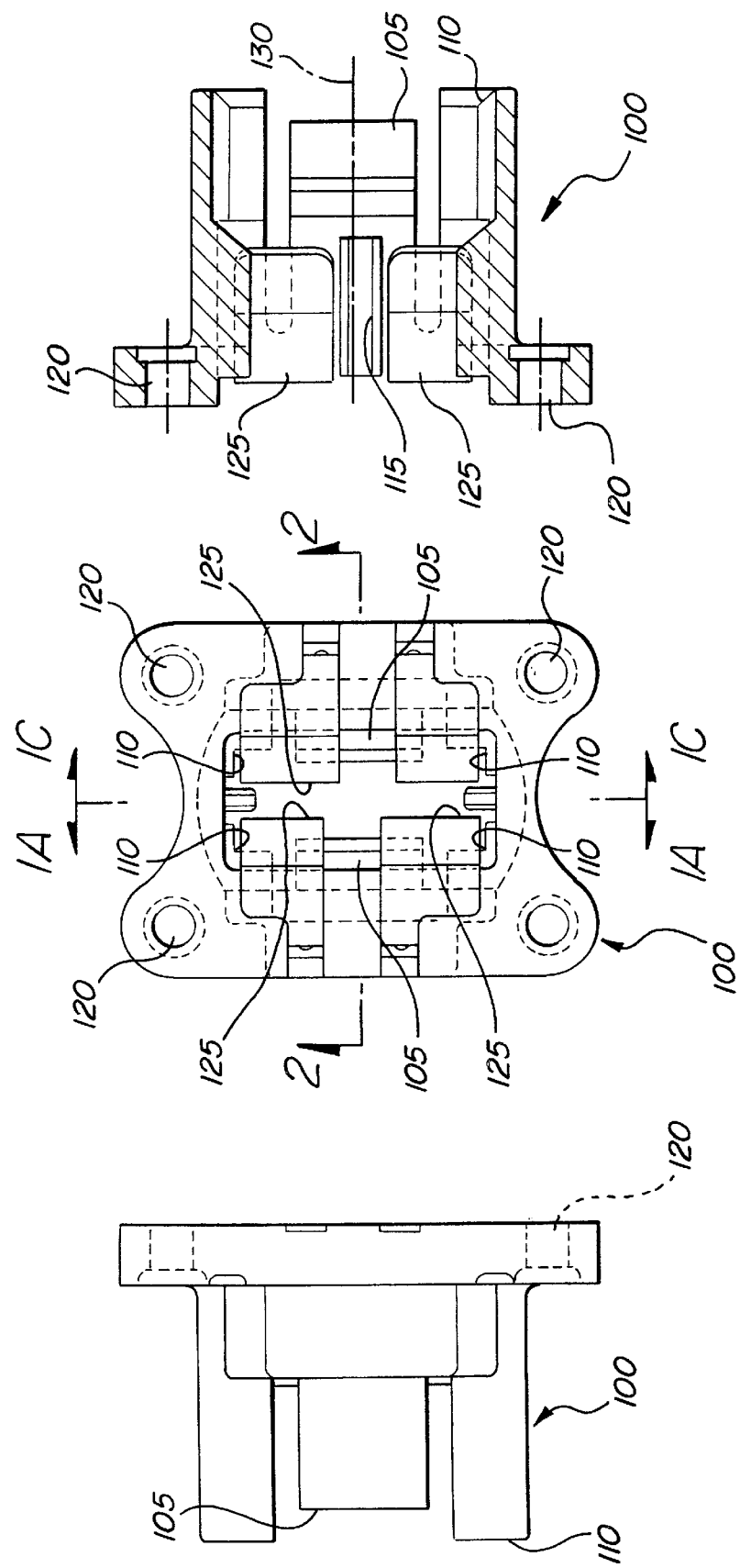
FIG. 1A is a side view of a lamp socket assembly.
FIG. 1B is a bottom view of the lamp socket assembly of FIG. 1A.
FIG. 1C is a cross-sectional side view of the lamp socket assembly of FIG. 1A.
Figure 2:
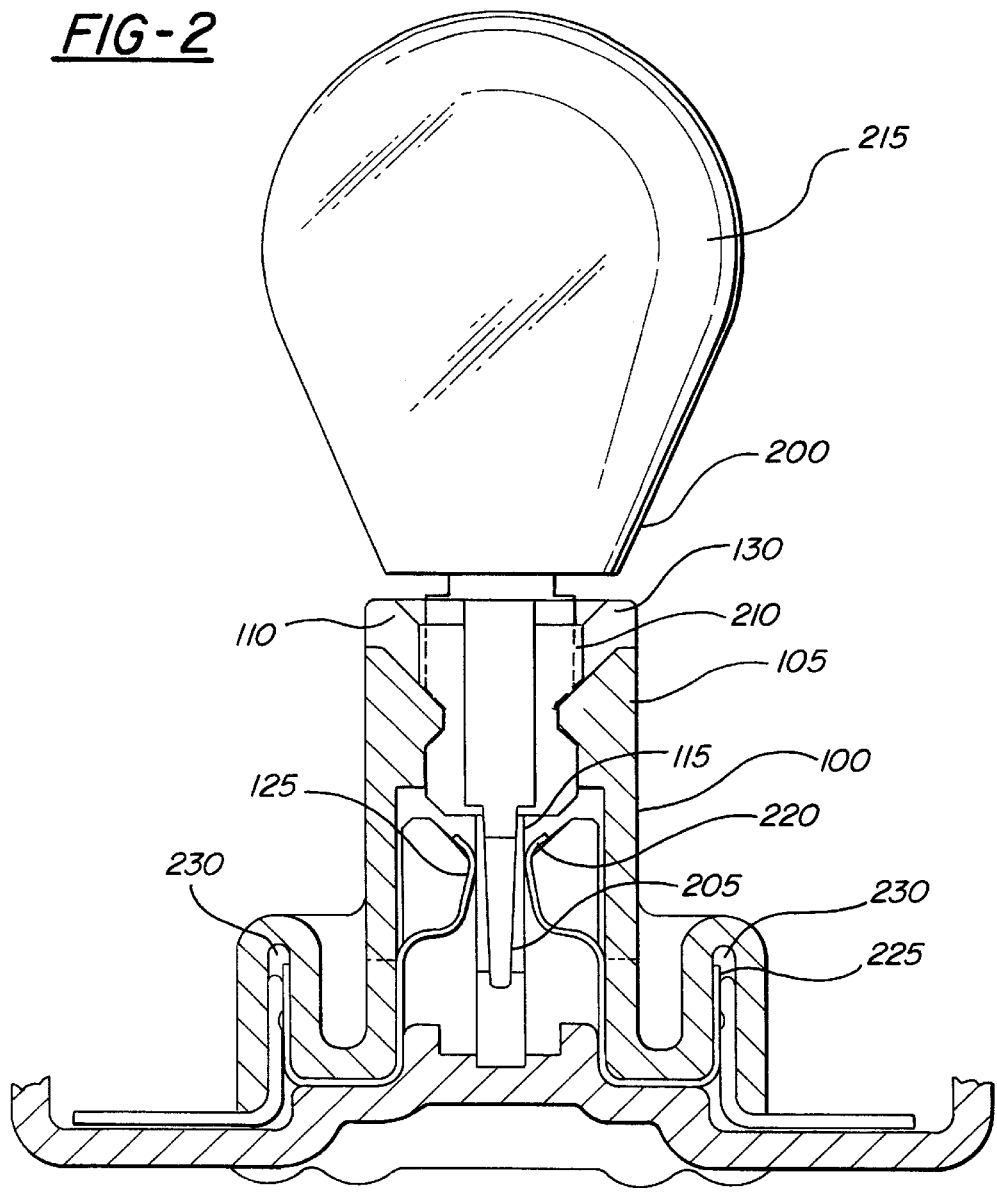
FIG. 2 is a cross-sectional side view of a bulb installed in the lamp socket assembly of FIG. 1A.

Referring to FIGS. 1A–1C, a lamp socket assembly 100 includes bulb retention fingers 105, a first bulb locating chamfer 110, a second bulb locating chamfer 115, four mounting holes 120, and a pair of metal bulb contact pads 125. Referring also to FIG. 2, a bulb 200 inserted into an opening 130 of socket assembly 100 includes a stem 205, a base 210 and a glass shell 215 containing a filament (not shown). The stem 205 is located and steadied by chamfer 115, and the base 210 is located and steadied by chamfer 110. The bulb 200 is retained in the opening 130 by retention fingers 105, which are flexible and exert compression against the base 210. Contact pads 125 exert compression against stem 205, which is in electrical connection with the bulb's filament, and provide an electrical connection to a source of electricity.

Lamp socket assembly 100 may be manufactured as a single piece by injection molding of a thermoplastic polymer. After injection molding, the bulb contact pads 125 are inserted into the socket assembly 100 where they terminate at a first end 220 adjacent to the stem 205 and at a second end 225 in a channel 230. Depending upon the number of filaments in the bulb, the socket assembly 100 may contain two or four bulb contact pads 125.

Figure 3:
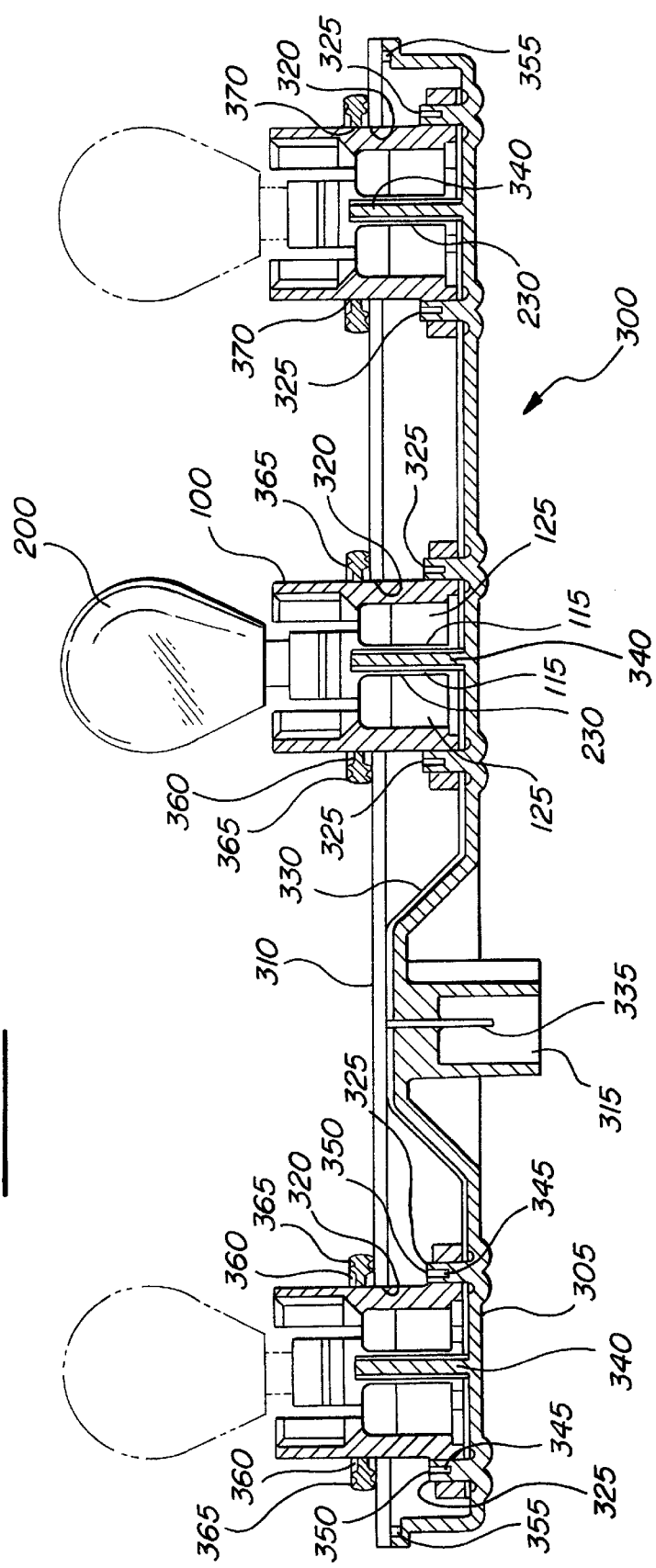
FIG. 3 is a side view of a backplate assembly having the lamp socket assembly of FIG. 1A installed.

Referring to FIG. 3, the lamp socket assembly 100 having bulb contact pads 125 inserted is integrally attached to a backplate assembly 300. The backplate assembly 300 has a base panel 305 and a similarly shaped front panel 310. Base panel 305 and front panel 310 are shell halves molded from a rigid insulative material, such as a thermoplastic polymer. Base panel 305 is generally planar in overall configuration but includes an offset region 315 coinciding with the area in which backplate assembly 300 connects to the automobile wiring harness.

Front panel 310 include three socket receiving apertures 320. One lamp socket assembly 100 passes through each aperture 320. Adjacent to each aperture 320 are four posts 325 (two of which are shown for each aperture) integral with base panel 305. Backplate assembly 300 includes embedded conductors 330 for electrically interconnecting the lamp socket assemblies 100 to a single socket connector 335. Conductors 330 form a positive fit with the bulb contact pads 125. Connector 335 mates the conductors 330 of backplate assembly 300 to an automobile wiring harness (not shown).

The lamp socket assembly 100 is integrally and permanently attached to the backplate assembly 300 by cold staking the posts 325 into the mounting holes 120 and inserting the metal prongs 340 into channel 230. Posts 325 have a hollow channel 345 at a tip 350 of the posts. The hollow channel 345 reduces the force required to cold stake the posts 325 in the mounting holes 120. The metal prongs 340 form a positive frictional fit against the bulb contact pads 125 when lamp socket assembly 100 is integrally attached to the base panel 305 of the backplate assembly 300.

Front panel 310 is attached to the backplate assembly 300 by passing apertures 320 over socket assemblies 100 and sealing front panel 310 to base panel 305. A seal 355 between front panel 310 and base panel 305 should be hermetic to protect the inner electrical components, such as conductors 330, from moisture. The seal may be, for example, formed by a hot melt adhesive or a hot plate weld.

Front panel 310 has a socket seal 360 above each aperture 320. Socket seal 360 is round and contains a pair of ribs 365 that encircle the circumference of the seal. When front panel 310 is attached to base panel 305, there is an interference fit between socket seal 360 and lamp socket assembly 100. Socket seal 360 is made of a low durometer thermoplastic elastomer that provides flexibility in the interference fit, which improves the seal. The socket seal 360 has a small sealing area 370 (i.e., the area of contact between the socket seal 360 and the lamp socket assembly 100), which reduces the compressive force required to form the seal as compared to a seal around the perimeter of the backplate.

Figure 4:
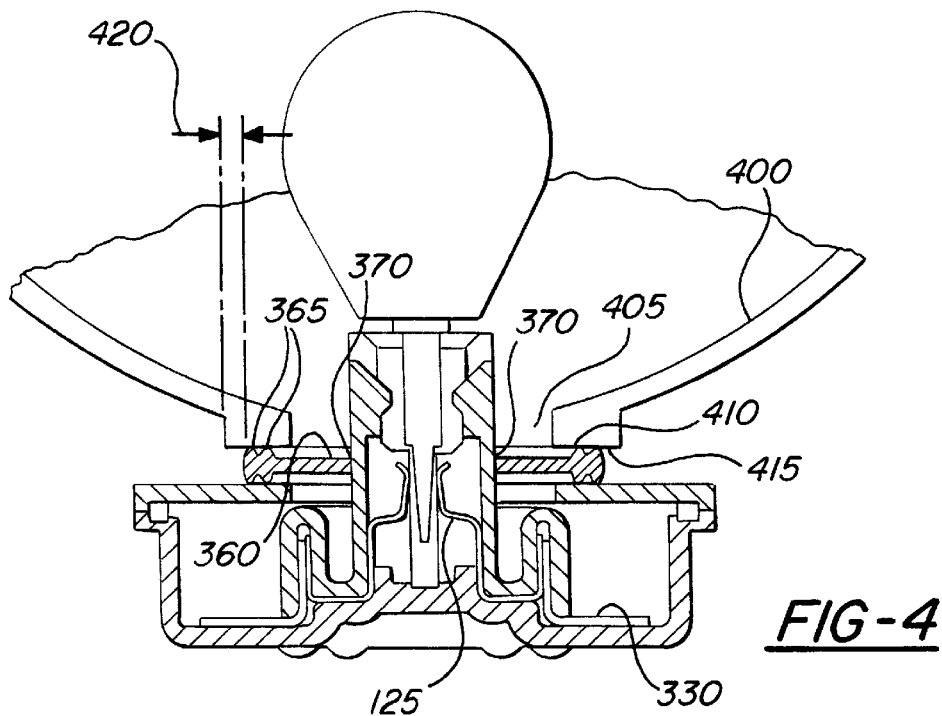
FIG. 4 is a side view of a lens attached to the backplate assembly of FIG. 3.

Referring to FIG. 4, a backplate assembly 300 may be attached to a reflector 400 of a lamp housing (not shown) of a car. Reflector 400 has an aperture 405 through which lamp socket assembly 100 is passed during assembly. Backplate assembly 300 and the lamp housing may be attached using, for example, screws, metal clips or molded retaining arms on the backplate assembly or lamp housing. Attaching the reflector to the backplate assembly forms a hermetic seal 410 at aperture 405 between socket seal 360 and a base 415 of reflector 400. The hermetic seal protects electrical circuitry connections, such as the positive interference fit between conductor 330 and contact pad 125, from moisture and corrosion. Hermetic seal 410 will be formed even if there is a variation in the reflector aperture 405. For example, a tolerance 420 in the diameter of aperture 405 will be accommodated by the hermetic seal 410. Thus, a range of reflectors having suitable aperture diameters may be mounted over lamp socket assembly 100.

Although the design of reflector 400 and backplate assembly 300 varies from automobile to automobile, lamp socket assembly 100 may be of one standard design. For example, if apertures 320 are on different planes, apertures 405 of reflector 400 will be on different planes. The design of the lamp socket assembly 100, however, remains the same. Moreover, suitable hermetic seals using socket seal 360 may still be made between reflector 400 and back plate 300 at each lamp socket 100 because the variation in plane will not affect the seal.

Figure 5:
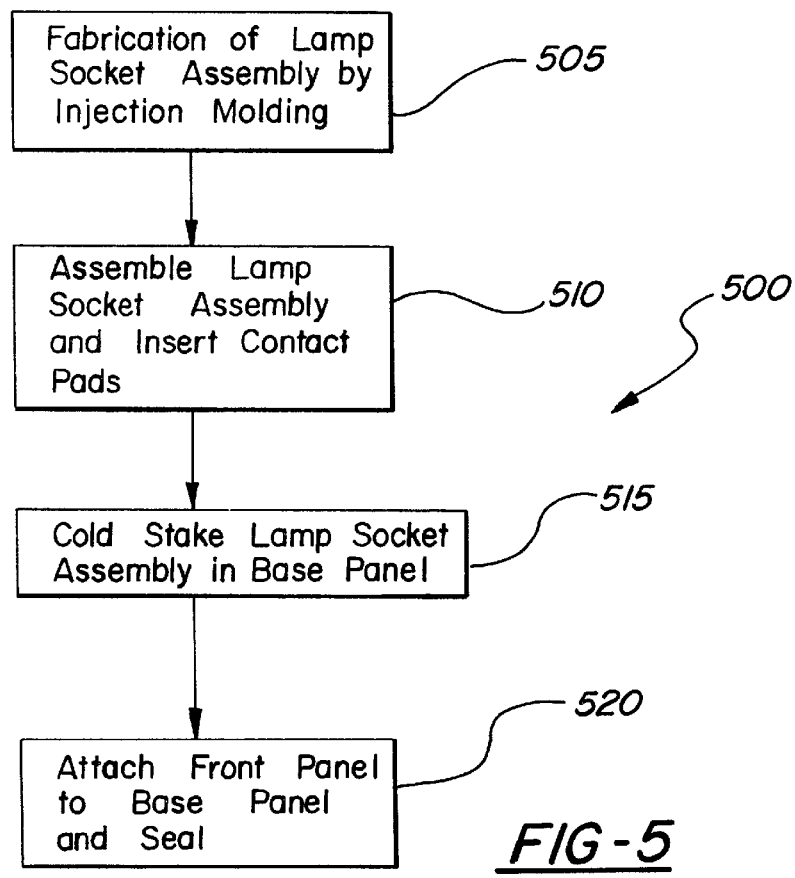
FIG. 5 is a flow chart illustrating the process of fabricating a backplate assembly having integral lamp socket assemblies.

Referring to FIG. 5, backplate assembly 300 having multiple, permanent integral socket assemblies 100 may be manufactured according to a process 500. The lamp socket assembly 100 is injection molded (step 505), and then contact pads 125 are inserted (step 510). The assembly 100 is placed on base panel 305 and cold staked over posts 325 (step 515). Cold staking the assembly 100 over the posts 325 permanently attaches the assembly to the base panel 305. The front panel 310 is placed against base panel 305 with socket assemblies 100 passing through apertures 320, and the panels sealed (step 520). Between steps 510 and 515, the socket assemblies may be placed in inventory until needed. In another implementation, steps 505 and 510 may be operated to provide assemblies 100 on a just-in-time basis for placement in base panel 305.

To accommodate assembling a variety of backplate assemblies for different types of cars, the tooling at step 515 may be changed when the backplate assembly is varied. The tooling to accommodate inserting the lamp socket assembly 100, however, may be constant because the assembly 100 is the same for every backplate assembly.

Figure 6:
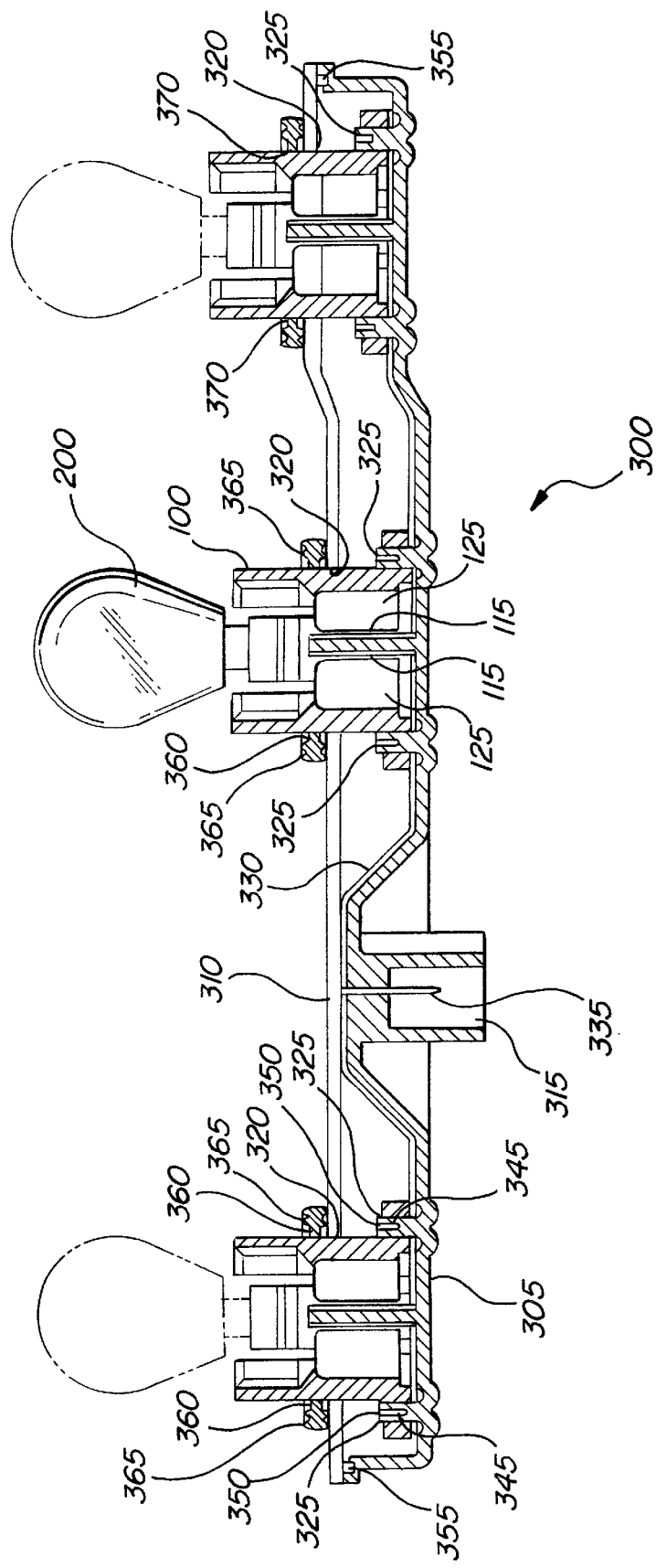
FIG. 6 is a side view of a backplate assembly having one of the apertures in a different plane than the other two apertures.

Other embodiments are within the scope of the following claims. For example, referring to FIG. 6, the backplate assembly 300 of FIG. 3 may be formed with one of the apertures in a different plane than the other two apertures.

What is claimed is:

1. A backplate assembly for mounting to a reflector and lens, comprising:
   a base panel having a conductor for conducting electricity and a mount configured to integrally attach a lamp socket assembly to the base panel;
   at least one separately molded lamp socket assembly; and
   a front panel attached to the base panel and having an aperture through which the lamp socket assembly passes,
   wherein the base panel, the front panel, and the lamp socket assembly are configured such that the lamp socket assembly is secured to the mount by inserting the lamp socket assembly into the back late assembly from and through the aperture in the front panel, without passing through the base panel.

2. The backplate assembly of claim 1, further comprising an individual socket seal adjacent to each aperture of the front panel.

3. The backplate assembly of claim 2, wherein the individual socket seal is made of a low durometer, thermoplastic elastomer.

4. The backplate assembly of claim 2, wherein the individual socket seal forms an interference fit with the lamp socket assembly.

5. The backplate assembly of claim 2, wherein the individual socket seal forms a seal with a lighting assembly.

6. The backplate assembly of claim 1, wherein
   the base panel includes a post adjacent to the aperture,
   the lamp socket assembly includes a mounting hole, and
   the post is cold staked in the mounting hole.

7. The backplate assembly of claim 6, wherein
   the base panel includes four posts adjacent to the aperture,
   the lamp socket assembly includes four mounting holes, and
   the posts are cold staked in the mounting holes.

8. The backplate assembly of claim 1, wherein the front panel includes three apertures.

9. The backplate assembly of claim 8, wherein at least one of the three apertures is on a different plane than the other apertures.

10. The backplate assembly of claim 1, wherein the lamp socket assembly is made as a separate, thermoplastic, injection molded piece.

11. The backplate assembly of claim 10, wherein the lamp socket assembly includes contact pads.

12. The backplate assembly of claim 11, wherein the conductor is electrically connected to the contact pads by a positive fit.

13. The backplate assembly of claim 10, wherein the lamp socket assembly has a bulb locating chamfer to locate and steady a stem of a light bulb.

14. The backplate assembly of claim 13, wherein the lamp socket assembly has a second bulb locating chamfer to locate and steady a light bulb.

15. A method of producing a backplate assembly, the method comprising:
   fabricating a base panel having a conductor and posts;
   fabricating a front panel having an aperture and a socket seal adjacent to the aperture;
   injection molding as a separate piece a lamp socket assembly having mounting holes; and
   inserting contact pads into the lamp socket assembly.

16. The method of claim 15, further comprising:
   inserting the posts into the mounting holes;
   forming a positive fit between the contact pads and the conductor; and
   cold staking the posts in the mounting holes.

17. The method of claim 16, further comprising:
   passing the aperture of the front panel over the lamp socket assembly;
   forming an interference fit between the lamp socket assembly and the socket seal; and
   sealing the front panel to the base panel.

18. The method of claim 17, wherein injection molding the lamp socket assembly comprises forming a bulb locating chamfer to locate and steady a stem of a light bulb.

19. The method of claim 18, wherein injection molding the lamp socket assembly comprises forming a second bulb locating chamfer to locate and steady the light bulb.

20. The method of claim 15, wherein injection molding the lamp socket assembly comprises using a thermoplastic elastomer.

21. The method of claim 15, wherein fabricating the base panel comprises positioning four posts adjacent to the aperture.

22. The method of claim 21, further comprising injection molding the lamp socket assembly to include four mounting holes.

23. The method of claim 15, wherein fabricating the front panel comprises forming three apertures.

24. The method of claim 23, wherein fabricating the front panel comprises forming at least one of the three apertures on a different plane than the remaining apertures.

25. The method of claim 17, further comprising attaching the backplate assembly to a lighting assembly.

26. The backplate assembly produced by the method of claim 17.

27. The backplate assembly produced by the method of claim 25.

* * * * *

UNITED STATES PATENT AND TRADEMARK OFFICE
CERTIFICATE OF CORRECTION

PATENT NO.    : 6,139,334
DATED         : October 31, 2000
INVENTOR(S)   : John Andrew Forish and Mark Christopher Molinaro It is certified that error appears in the above-identified patent and that said Letters Patent is hereby corrected as shown below:

<u>Column 5,</u>
Line 15, delete "back late" and insert therefor -- backplate --.

Signed and Sealed this

Twenty-sixth Day of February, 2002

Attest:

JAMES E. ROGAN
Attesting Officer    Director of the United States Patent and Trademark Office